US008885075B2

(12) United States Patent
Kanemitsu et al.

(10) Patent No.: US 8,885,075 B2
(45) Date of Patent: Nov. 11, 2014

(54) IMAGE PROCESSING DEVICE, IMAGE PROCESSING METHOD, AND SOLID-STATE IMAGING DEVICE

(75) Inventors: Shiroshi Kanemitsu, Kanagawa (JP); Tatsuji Ashitani, Kanagawa (JP); Yukiyasu Tatsuzawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 393 days.

(21) Appl. No.: 13/418,780

(22) Filed: Mar. 13, 2012

(65) Prior Publication Data

US 2012/0314106 A1 Dec. 13, 2012

(30) Foreign Application Priority Data

Jun. 7, 2011 (JP) ................................ 2011-127227

(51) Int. Cl.
*H04N 9/64* (2006.01)
*H04N 5/217* (2011.01)
*H04N 5/235* (2006.01)
*H04N 5/361* (2011.01)
*H04N 5/16* (2006.01)

(52) U.S. Cl.
CPC .............. *H04N 5/165* (2013.01); *H04N 5/361* (2013.01)
USPC ......................... 348/243; 348/241; 348/222.1

(58) Field of Classification Search
USPC ................ 348/241, 243, 222.1; 382/232–253
See application file for complete search history.

(56) References Cited

U.S. PATENT DOCUMENTS

2009/0073288 A1* 3/2009 Tsuruoka ...................... 348/241
2010/0027061 A1* 2/2010 Nakazawa ................... 358/1.15

FOREIGN PATENT DOCUMENTS

| JP | 2003-92705 | 3/2003 |
| JP | 2006-287412 | 10/2006 |
| JP | 2006-303953 | 11/2006 |
| JP | 2008-219593 | 9/2008 |

\* cited by examiner

*Primary Examiner* — Joel Fosselman
(74) *Attorney, Agent, or Firm* — Oblon, Spivak, McClelland, Maier & Neustadt, L.L.P.

(57) ABSTRACT

According to embodiment, an image processing device includes a black level correcting section. The black level correcting section includes a first input restricting unit and a second input restricting unit. The second input restricting unit performs a second input restriction, having a second signal level range including a moving average as a reference, on a black level signal subjected to a first input restriction by the first input restricting unit. A correction amount calculation unit calculates a difference of an average of signal values subjected to the second input restriction and a black level standard value as a correction value to apply on an effective pixel signal.

20 Claims, 10 Drawing Sheets

IMAGE PROCESSING DEVICE, IMAGE PROCESSING METHOD, AND SOLID-STATE IMAGING DEVICE

CROSS-REFERENCE TO RELATED APPLICATIONS

This application is based upon and claims the benefit of priority from Japanese Patent Application No. 2011-127227, filed on Jun. 7, 2011; the entire contents of all of which are incorporated herein by reference.

FIELD

The present embodiments typically relate to an image processing device, an image processing method, and a solid-state imaging device.

BACKGROUND

A solid-state imaging device in which a black level correction is performed on an effective pixel signal from an effective pixel section using a black level signal from an optical black (OB) section subjected to light shield is conventionally known. When assuming a difference of an addition average of the values of the black level signals from the OB section and a desired black level standard value as a correction value to apply on the effective pixel signal, an input restriction of a certain level is sometimes performed on the black level signal to reduce the influence of noise due to output abnormality and the like for every pixel.

The solid-state imaging device sometimes causes unevenness in dark current (hereinafter appropriately referred to as "dark period shading") due to properties, and the like of the element. Countermeasures of imposing an input restriction may be taken with a noise amount added with a shading amount as a tolerable range with respect to the noise generated when the DC (Direct Current) level of the black level signal fluctuates by the dark period shading. In this case, the tolerable range is greatly enlarged by the addition of the shading amount, and hence it becomes difficult to effectively reduce the influence of noise in the black level correction.

Furthermore, the solid-state imaging device may have the OB section divided into a plurality of blocks, and the weighting of the black level correction may be differed for every block. In this case, it becomes difficult to sufficiently function the weighing of the black level correction if there is calculation error due to white defects and the like, or if there is fluctuation in the DC level due to the dark period shading.

DETAILED DESCRIPTION

According to embodiments, an image processing device includes a black level correcting section. The black level correcting section corrects a black level of an effective pixel signal on the basis of a black level signal. The black level signal is read from an optical black section. In the optical black section, a photoelectric conversion element is light shielded. The effective pixel signal is read from an effective pixel section. In the effective pixel section, a light enters the photoelectric conversion element. The black level correcting section includes a first input restricting unit, a moving average calculation unit, a second input restricting unit, and a correction amount calculation unit. The first input restricting unit performs a first input restriction, having a preset first signal level range as a reference, on the black level signal. The moving average calculation unit calculates a moving average of signal values for the black level signals subjected to the first input restriction. The second input restricting unit performs a second input restriction, having a second signal level range including the moving average as a reference, on the black level signal subjected to the first input restriction. The correction amount calculation unit calculates a difference of an average of the signal values subjected to the second input restriction and a black level standard value as a correction value to apply on the effective pixel signal. The black level standard value is the standard of the black level of the effective pixel signal.

An image processing device, an image processing method, and a solid-state imaging device according to the embodiments will be hereinafter described in detail with reference to the accompanied drawings. It should be recognized that the present invention is not limited by such embodiments.

Figure 1:
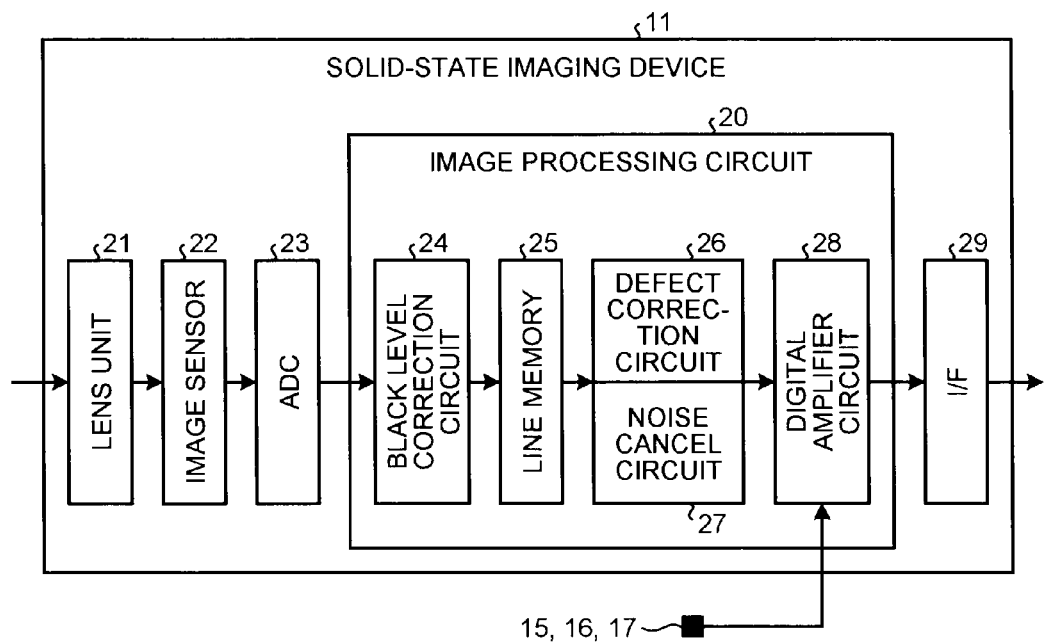
FIG. 1 is a block diagram showing a schematic configuration of a solid-state imaging device according to a first embodiment.
Figure 2:
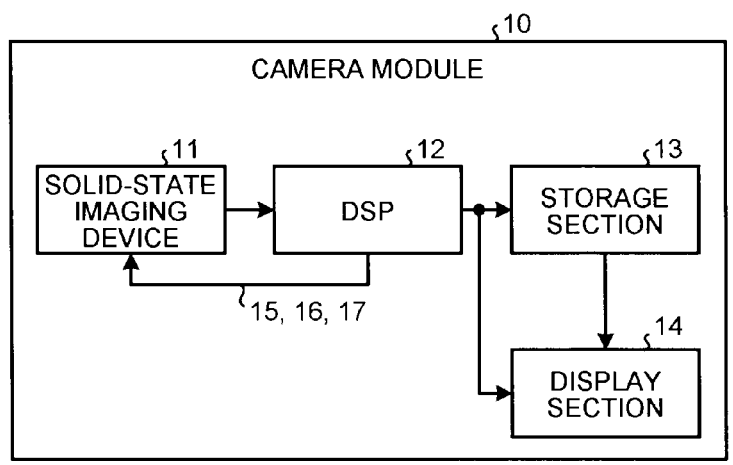
FIG. 2 is a block diagram showing a camera module including the solid-state imaging device shown in FIG. 1.

FIG. 1 is a block diagram showing a schematic configuration of a solid-state imaging device according to a first embodiment. FIG. 2 is a block diagram showing a configuration of a camera module including the solid-state imaging device shown in FIG. 1. A camera module 10 is, for example, a digital camera. The camera module 10 may be an electronic device other than the digital camera such as a portable telephone with a camera.

The camera module 10 includes a solid-state imaging device 11, a digital signal processor (DSP) 12, a storage section 13, and a display section 14. The solid-state imaging device 11 images a subject image. The DSP 12 performs signal process on an image signal obtained by the imaging in the solid-state imaging device 11. For instance, the DSP 12 performs shading correction, auto-exposure (AE) adjustment, auto white balance (AWB) adjustment, matrix process, contour enhancement, luminance compression, gamma process, and the like on a RAW image output from the solid-state imaging device 11. The DSP 12 outputs a shading coefficient 15 for the shading correction, an AWB coefficient 16 for the AWB adjustment, and an analog gain (AG) coefficient 17 for the AE adjustment to the solid-state imaging device 11.

The storage section 13 stores images subjected to the signal processing in the DSP 12. The storage section 13 outputs an image signal to the display section 14 according to the operation and the like of the user. The display section 14 displays an image according to the image signal input from the DSP 12 or the storage section 13. The display section 14 is, for example, a liquid crystal display.

The solid-state imaging device 11 includes an image processing circuit (image processing device) 20, a lens unit 21, an image sensor 22, an analog digital converter (ADC) 23, and an interface (I/F) 29.

The lens unit 21 retrieves light from a subject, and images a subject image with the image sensor 22. The image sensor 22 converts the light retrieved by the lens unit 21 to signal charges, and images the subject image. The image sensor 22 generates an analog image signal by retrieving signal values of red (R), green (G), and blue (B) in the order corresponding to a Bayer array.

The ADC 23 converts the image signal from the image sensor 22 from an analog format to a digital format. The image processing circuit 20 performs various image processing on the digital image signal from the ADC 23. The I/F 29 outputs an image signal subjected to the signal processing in the image processing circuit 20. The I/F 29 may carry out a conversion from a serial input to a parallel output, or a conversion from a parallel input to a serial output.

The image processing circuit 20 includes a black level correction circuit (black level correcting section) 24, a line memory 25, a defect correction circuit 26, a noise cancel circuit 27, and a digital amplifier circuit 28. The black level correction circuit 24 corrects the black level of the digital image signal from the ADC 23. The line memory 25 holds the digital image signal from the black level correction circuit 24.

The defect correction circuit 26 and the noise cancel circuit 27 commonly use the line memory 25. The defect correction circuit 26 performs a defect correction for correcting a defected portion (defect) of the image signal caused by the pixel that is not normally functioning in the image sensor 22 on the digital image signal from the line memory 25. The noise cancel circuit 27 performs a noise cancel process for reducing noise.

The digital amplifier circuit 28 uses the shading coefficient 15, the AWB coefficient 16, and the AG coefficient 17 from the DSP 12 to calculate a digital amplifier coefficient. The digital amplifier circuit 28 multiplies the digital amplifier coefficient to the image signal from the defect correction circuit 26 and the noise cancel circuit 27. The camera module 10 may perform at least one part of the process, which is performed in the DSP 12 in the present embodiment, with the image processing circuit 20 of the solid-state imaging device 11.

Figure 3:
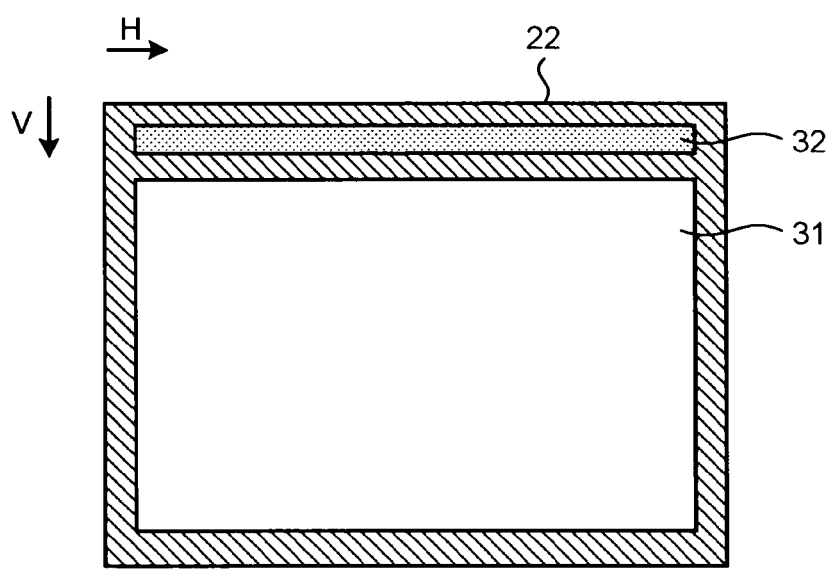
FIG. 3 is a view showing an example of a pixel configuration of an image sensor.

FIG. 3 is a view showing an example of a pixel configuration of an image sensor. The image sensor 22 includes an effective pixel section 31 and an optical black (OB) section 32 arranged on the outer side of the effective pixel section 31. The effective pixel section 31 is configured by pixels in which the light enters the photoelectric conversion element. The effective pixel section 31 outputs an effective pixel signal corresponding to a light intensity entered to the photoelectric conversion element.

The OB section 32 is configured by pixels in which the photoelectric conversion element is light shielded by a light shielding member such as an aluminum member. The pixel configuring the OB section 32 has properties similar to the pixel configuring the effective pixel section 31 other than that the light shielding member is arranged. The OB section 32 outputs a black level signal. The OB section 32 is arranged on an upstream side in a vertical transfer direction (V direction) with respect to the effective pixel section 31. Other than the OB section 32, the image sensor 22 may have the OB section 32 arranged on the upstream side or the downstream side of a horizontal transfer direction (H direction) with respect to the effective pixel section 31.

Figure 4:
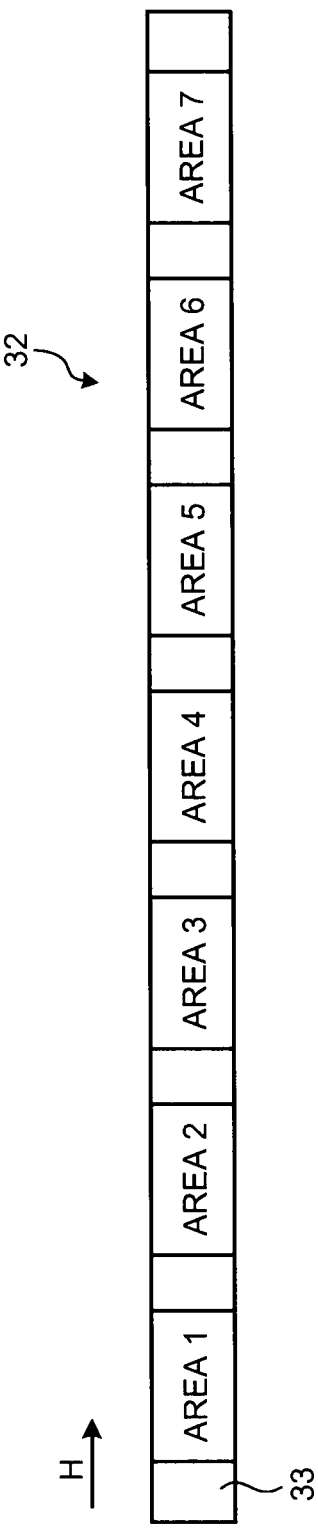
FIG. 4 is a view describing a setting of an area in an OB section.

FIG. 4 is a view describing the setting of the area in the OB section. The OB section 32 is set with seven areas 1 to 7. The areas 1 to 7 are arranged with spacing with respect to each other, and are arranged in parallel in the H direction. A space between the area 1 positioned on the most upstream side in the H direction of the areas 1 to 7 and the end on the upstream side in the H direction of the OB section 32 is an offset region 33. The area to be set in the OB section 32 merely needs to be in plurals, and is not limited to seven. Each area may be arranged without spacing.

Figure 5:
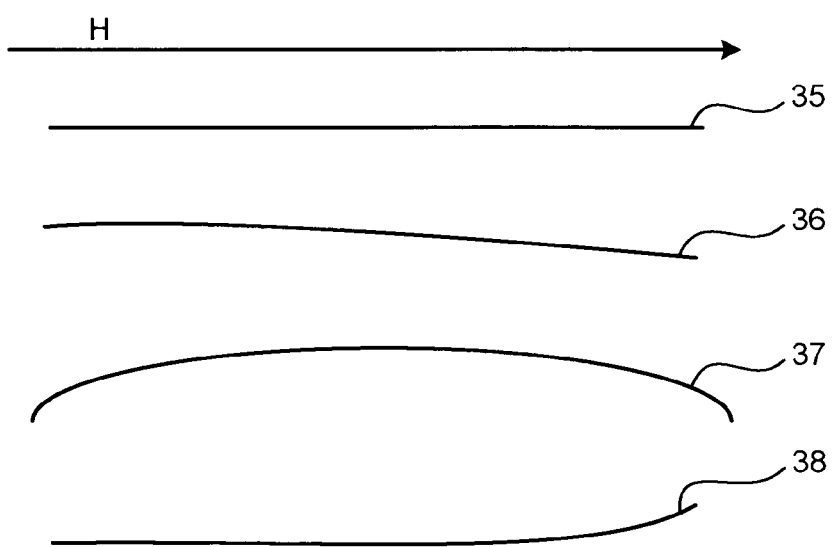
FIG. 5 is a view describing the occurrence of a dark period shading.

FIG. 5 is a view describing the occurrence of the dark period shading. Curves 35, 36, 37, 38 in the figure each represent the fluctuation properties of the DC level in the H direction. The curve 35 represents the property of when the fluctuation of the DC level does not occur in the entire region in the H direction. The curve 36 represents the property in which the DC level lowers with advancement in the H direction in the wider range in the H direction. The curve 37 represents the property in which the rise of the DC level occurs at both ends in the H direction, and the DC level becomes a maximum at the center portion in the H direction. The curve 38 represents the property in which the DC level rises in the vicinity of the end on the downstream side in the H direction.

The dark period shading occurs by the influence of the bluntness of the reset pulse or the read pulse of the pixel, the impedance of the ground electrode, the heat generated from the circuit arranged in the image sensor 22, and the like. The dark period shading is assumed as a property unique for every design of the image sensor 22.

Figure 6:
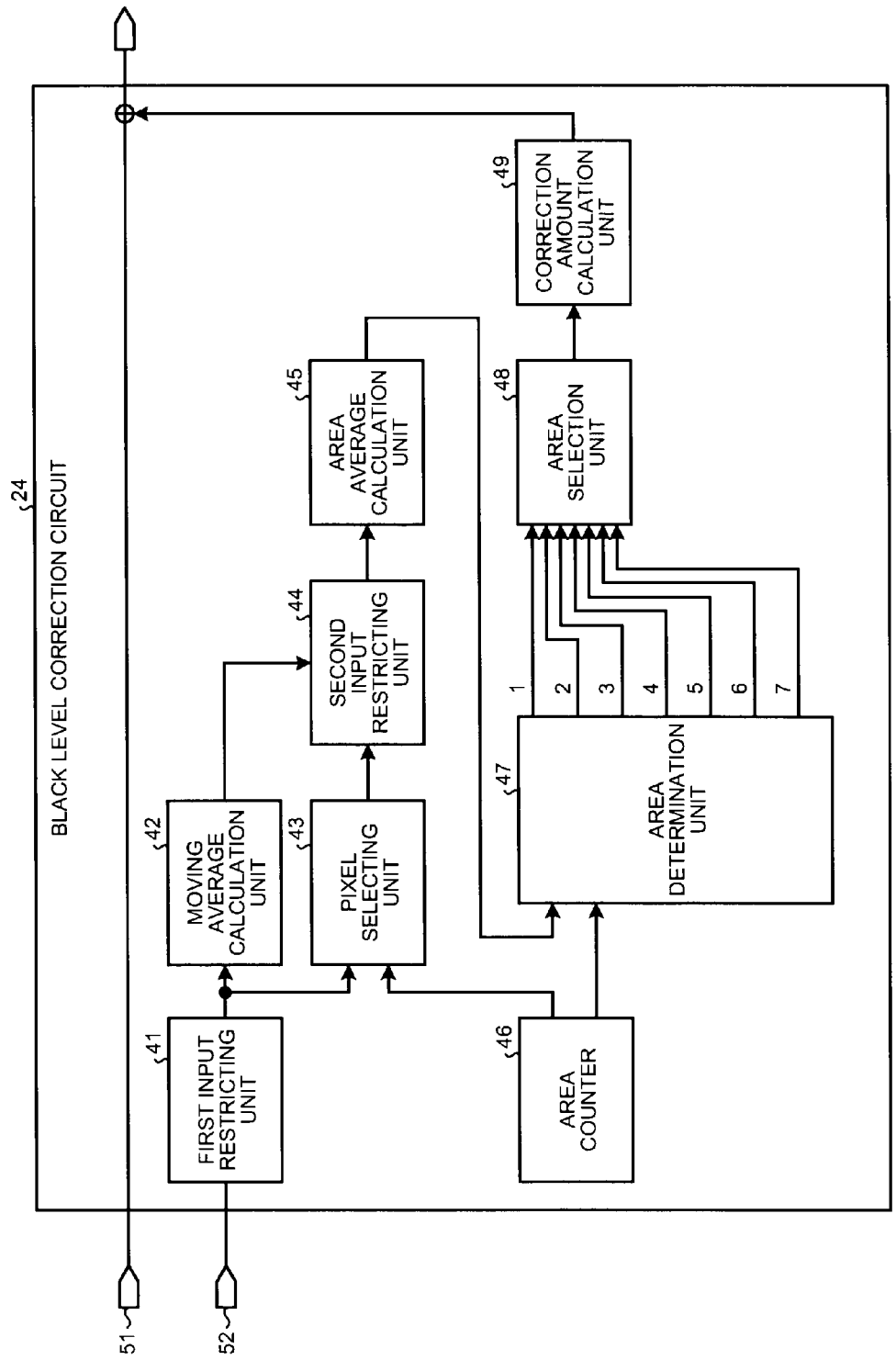
FIG. 6 is a block diagram showing a configuration of a black level correction circuit.

FIG. 6 is a block diagram showing a configuration of the black level correction circuit. The digital image signal from the ADC 23 (see FIG. 1) is divided into an effective pixel signal 51 from the effective pixel section (see FIG. 3) and a black level signal 52 from the OB section 32, and input to the black level correction circuit 24. The black level correction circuit 24 corrects the black level of the effective pixel signal 51 read out from the effective pixel section 31 based on the black level signal 52 read out from the OB section 32.

The black level correction circuit 24 includes a first input restricting unit 41, a moving average calculation unit 42, a pixel selecting unit 43, a second input restricting unit 44, an area average calculation unit 45, an area counter 46, an area determination unit 47, an area selection unit 48, and a correction amount calculation unit 49. The first input restricting unit 41 performs a first input restriction, having a first signal level range as a reference, with the black level signal 52 input to the black level correction circuit 24 as a target.

Figure 7:
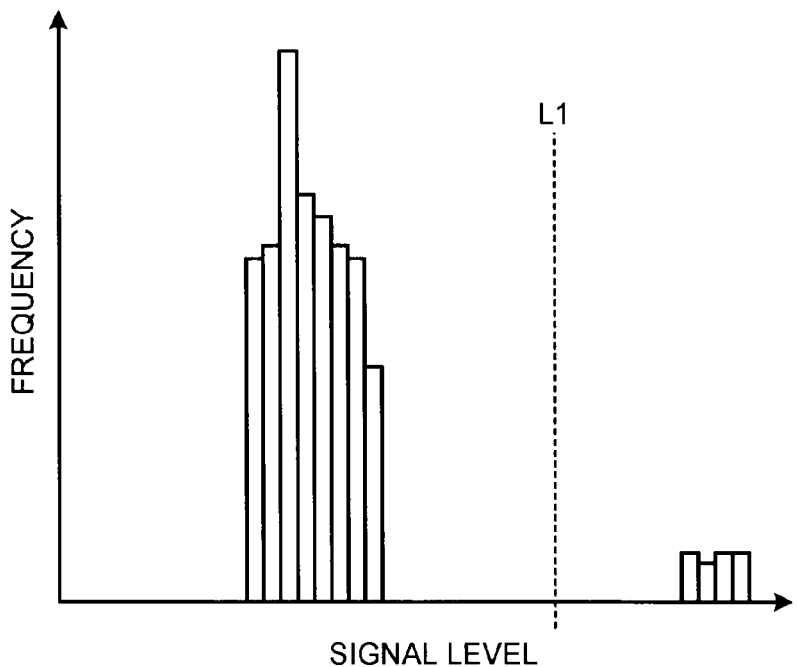
FIG. 7 is a view describing a first input restriction of a black level signal by a first input restricting unit.

FIG. 7 is a view describing the first input restriction of the black level signal by the first input restricting unit. The first input restricting unit 41 excludes data greatly deviated from the normal signal level of the black level signal 52 due to the white defect produced in the OB section 32, the light leakage in the light shielding member arranged in the photoelectric conversion element, and the like. The white defect is a defect in which high luminance is detected compared to when the pixel is normally functioning.

For instance, the first input restricting unit 41 holds an upper limit value L1 set in advance as an upper limit of the first signal level range. The first input restricting unit 41 cuts the data having a signal value exceeding the upper limit value L1 shown with a broken line in a histogram distribution shown in FIG. 7. The first input restricting unit 41 replaces a signal value in which the signal level exceeds the upper limit value L1 with a desired black level standard value. The black level standard value is a value set in advance as a standard of the black level of the effective pixel signal 51, and is, for example, 64LSB.

The moving average calculation unit 42 calculates the moving average of the signal value for the black level signal 52 subjected to the first input restriction by the first input restricting unit 41. The moving average calculation unit 42 uses the signal value of a predetermined number of pixels input immediately before the signal value of the target pixel, which is a determination target of the second input restriction in the second input restricting unit 44 to be described later, for the calculation of the moving average.

The pixel of the offset region 33 is used for the calculation of the moving average for the target pixel in which the signal value is input first to the black level correction circuit 24 of the area 1 (see FIG. 4) of the OB section 32. The moving average calculation unit 42 moves the range of the pixel to use in the calculation of the moving average in the H direction by one pixel with the scanning of the target pixel in the H direction.

The area counter 46 outputs an area identification signal representing an area including the target pixel when the target pixel is a pixel included in one of the areas 1 to 7. The area counter 46 determines the area including the target pixel from the count value in the H direction.

The pixel selecting unit 43 selects the black level signal 52 for the pixel included in one of the areas 1 to 7 according to the area identification signal from the area counter 46. The second input restricting unit 44 performs a second input restriction, having a second signal level range as a reference, with the black level signal 52 on the pixel selected by the pixel selecting unit 43 as a target.

Figure 8:
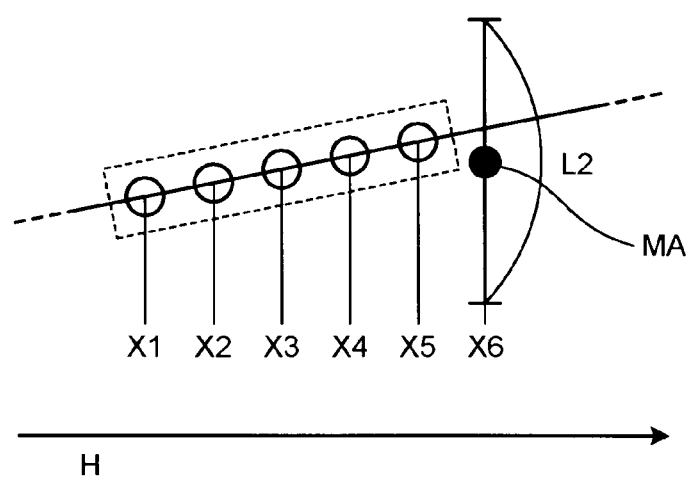
FIG. 8 and FIG. 9 are views describing a second input restriction of the black level signal by a second input restricting unit.
Figure 9:
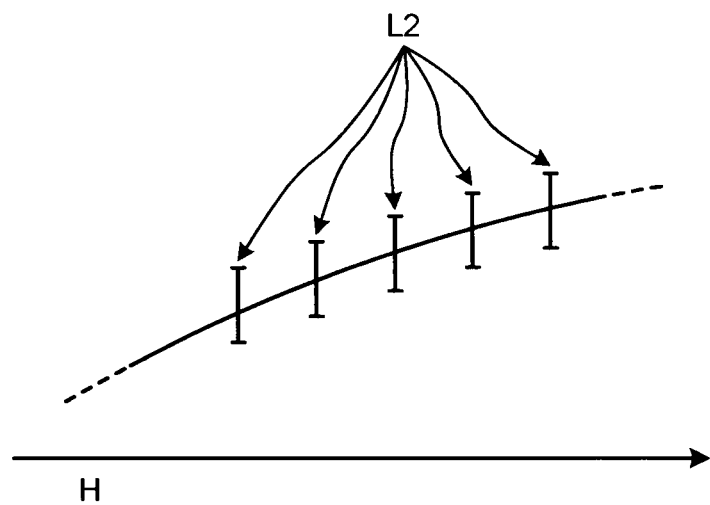

FIG. 8 and FIG. 9 are views describing the second input restriction of the black level signal by the second input restricting unit. As shown in FIG. 8, the second input restriction having the pixel at a position X6 in the H direction as a target pixel will be described by way of example. The moving average calculation unit 42 uses the signal values of five pixels X1 to X5 input immediately before the signal value of the target pixel at the position X6 to calculate a moving average MA. The moving average calculation unit 42 calculates the moving average MA every time the position X6 of the target pixel moves in the H direction. The range of the pixels X1 to X5 also moves in the H direction with the movement of the position X6 of the target pixel in the H direction. If the target pixel is the pixel on the most upstream side in the H direction in the area 1 of the OB section 32, the pixels X1 to X5 used in the calculation of the moving average MA are all pixels included in the offset region 33.

The second input restricting unit 44 holds a preset signal value range L2. The second input restricting unit 44 assumes the signal value range L2 having the moving average MA as a center as the second signal level range for the target pixel at the position X6. The pixel to use for the calculation of the moving average MA is not limited to five, and may be an arbitrary number. The moving average MA may be any one of simple moving average, weighted moving average, or the like.

The second input restricting unit 44 replaces the signal value higher than the maximum value of the signal value range L2 with the maximum value. The second input restricting unit 44 replaces the signal value lower than a minimum value of the signal value range L2 with the minimum value. As shown in FIG. 9, the signal value range L2 assumed as the second signal level range moves following the fluctuation of the DC level as the moving average MA is the center. The second input restricting unit 44 can exclude the influence of noise from the black level signal 52 following the fluctuation of the DC level by the dark period shading by the second input restriction using the second signal level range having the moving average MA as the center.

The area average calculation unit 45 calculates the area average for the black level signal 52 subjected to the second input restriction by the second input restricting unit 44. The area average is the average of the signal values for every area 1 to 7 of the OB section 32. The area determination unit 47 stores the area average calculated by the area average calculation unit 45. The area determination unit 47 determines which area the area average from the area average calculation unit 45 is from according to the area identification signal from the area counter 46.

The area selection unit 48 selects the area which area average is used for the calculation of the correction amount in the correction amount calculation unit 49 from the plurality of areas 1 to 7 of the OB section 32. For instance, with respect to the image sensor 22 having a fluctuation property of the DC level as shown with the curve 38 shown in FIG. 5, the area selection unit 48 excludes the area average of the areas 6 and 7 positioned on the downstream side in the H direction and selects the area average of the areas 1 to 5 in which the DC level is stable.

The black level correction circuit 24 can reduce the lowering in accuracy of the black level correction due to the influence of the dark period shading and reduce re-designing and re-layout of the product as much as possible by the area selection of the area selection unit 48.

The correction amount calculation unit 49 further averages the area average selected by the area selection unit 48, and calculates the difference between the average value thereof and the black level standard value as the correction amount to apply on the effective pixel signal 51. The black level correction circuit 24 adds or subtracts the correction amount calculated by the correction amount calculation unit 49 to or from the effective pixel signal 51. The black level correction circuit 24 thereby outputs the effective pixel signal 51 corrected on the basis of the black level signal 52.

Therefore, the black level correction circuit 24 uses the first input restricting unit 41 and the second input restricting unit 44 to perform the two-stage input restriction on the black level signal 52. The black level correction circuit 24 performs the first input restriction by the first input restricting unit 41 as a rough input restriction on white defects, light leakage, and the like. The black level correction circuit 24 performs the second input restriction following the fluctuation of the DC level by the second input restricting unit 44 as a fine input restriction on noise.

The black level correction circuit 24 can improve the accuracy of the second input restriction on the black level signal 52 by performing the first input restriction on the black level signal 52 before the calculation of the moving average MA by the moving average calculation unit 42. The image processing circuit 20 can obtain a high quality image with a highly accurate black level correction by including the black level correction circuit 24.

The black level correction circuit 24 may perform an area selection corresponding to the fluctuation properties of the DC level in the pixel selecting unit 43, for example. The black level correction circuit 24 can reduce the calculation process on an area to exclude from the calculation of the correction amount by performing the area selection prior to the second input restriction in the second input restricting unit 44 and the calculation of the area average in the area average calculation unit 45.

Figure 10:
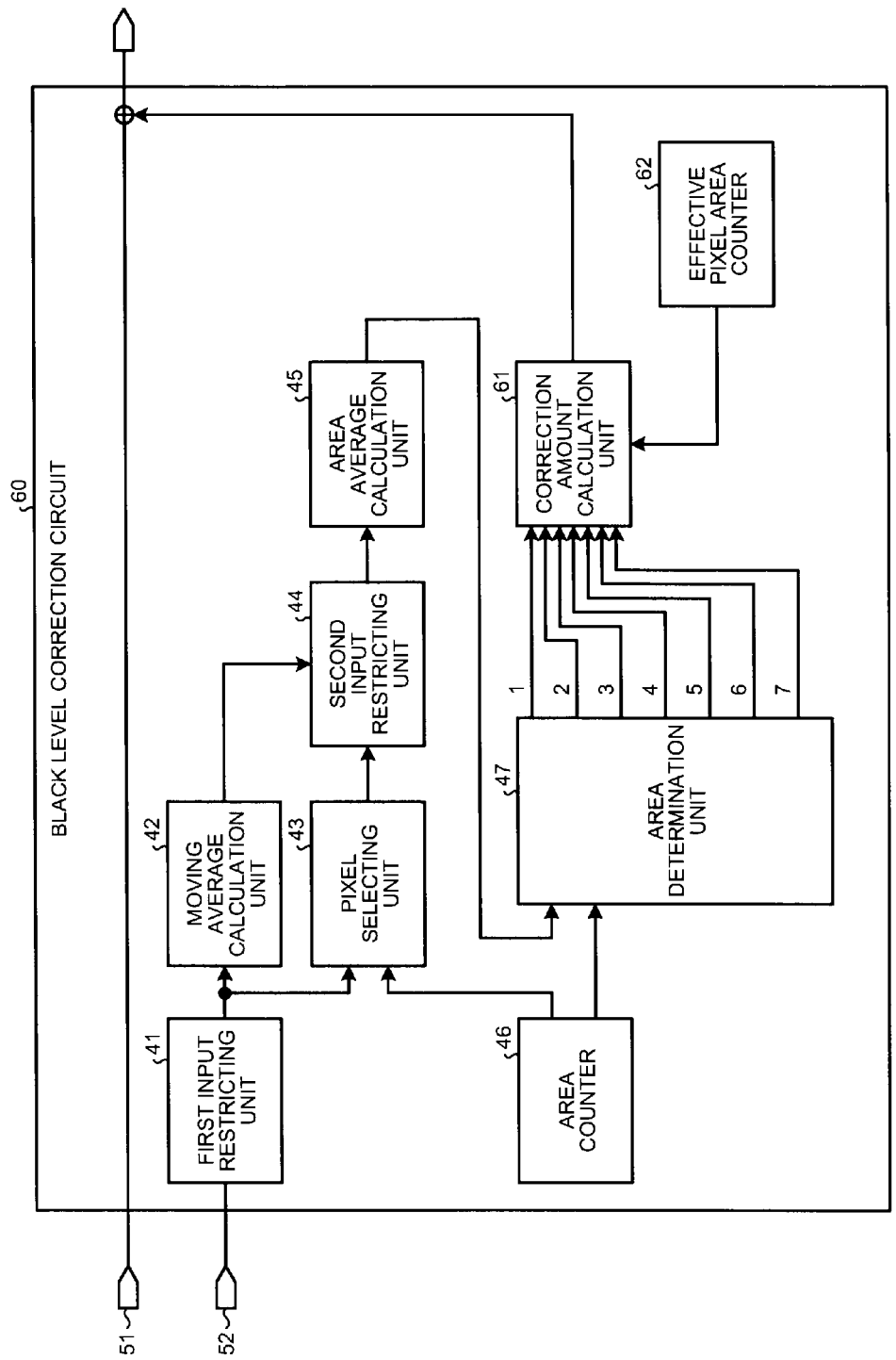
FIG. 10 is a block diagram showing a configuration of a black level correction circuit to be applied on a solid-state imaging device according to a second embodiment.

FIG. 10 is a block diagram showing a configuration of a black level correction circuit to be applied to a solid-state imaging device according to a second embodiment. A black level correction circuit 60 according to the present embodiment is applied in place of the black level correction circuit 24 (see FIG. 6) according to the first embodiment. The same reference numerals are denoted for the same portions as the first embodiment, and redundant description will be appropriately omitted.

Figure 11:
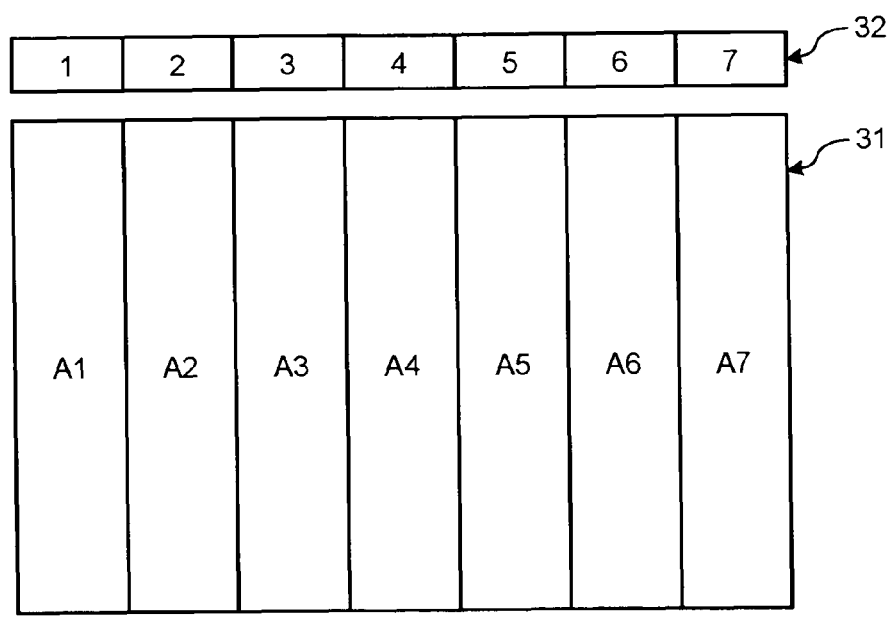
FIG. 11 is a view describing a setting of an effective pixel area in an effective pixel section.

FIG. 11 is a view describing a setting of an effective pixel area in the effective pixel section. Similar to the OB section 32, the effective pixel section 31 is set with seven effective pixel areas A1 to A7. In the present embodiment, the areas 1 to 7 of the OB section 32 are lined in the H direction without spacing. The effective pixel areas A1 to A7 of the effective pixel section 31 are also lined in the H direction without spacing. Similar to the first embodiment, the OB section 32 may include the offset region 33 (see FIG. 4).

The position in the H direction coincide for the area 1 of the OB section 32 and the effective pixel area A1 of the effective pixel section 31. The positions in the H direction also respectively coincide for the areas 2 to 7 of the OB section 32 and the effective pixel areas A2 to A7 of the effective pixel section 31, similar to the area 1 and the effective pixel area A1.

The effective pixel area counter 62 determines whether or not the effective pixel signal 51 input to the black level correction circuit 60 is for one of the effective pixel areas A1 to A7 from the count value with respect to the H direction, for example.

The correction amount calculation unit 61 calculates the area average for the area corresponding to the effective pixel area determined in the effective pixel area counter 62 of the area averages stored in the area determination unit 47 as the correction amount to apply on the effective pixel signal 51 of the relevant effective pixel area. Therefore, the correction amount calculation unit 61 applies each correction amount calculated for every area of the OB section 32 on the effective pixel signal 51 from the effective pixel area corresponding to the area of the OB section 32 of the effective pixel section 31.

The black level correction circuit 60 thus can reduce the shift of the black level for every position in the H direction that occurs by the dark period shading with the black level correction for every effective pixel area A1 to A7. The image processing circuit 20 can obtain a high quality image with a highly accurate black level correction by including the black level correction circuit 60.

The area set in the OB section 32 merely needs to be in plurals, and is not limited to seven. The effective pixel area set in the effective pixel section 31 merely needs to be the same number as the area set in the OB section 32. The areas of the OB section 32 may be arranged with spacing with respect to each other. In this case, the correction amount calculation unit 61 may apply an interpolation value of the correction amount calculated for each area, for example, as the correction amount to apply on each effective pixel area of the effective pixel section 31.

Figure 12:
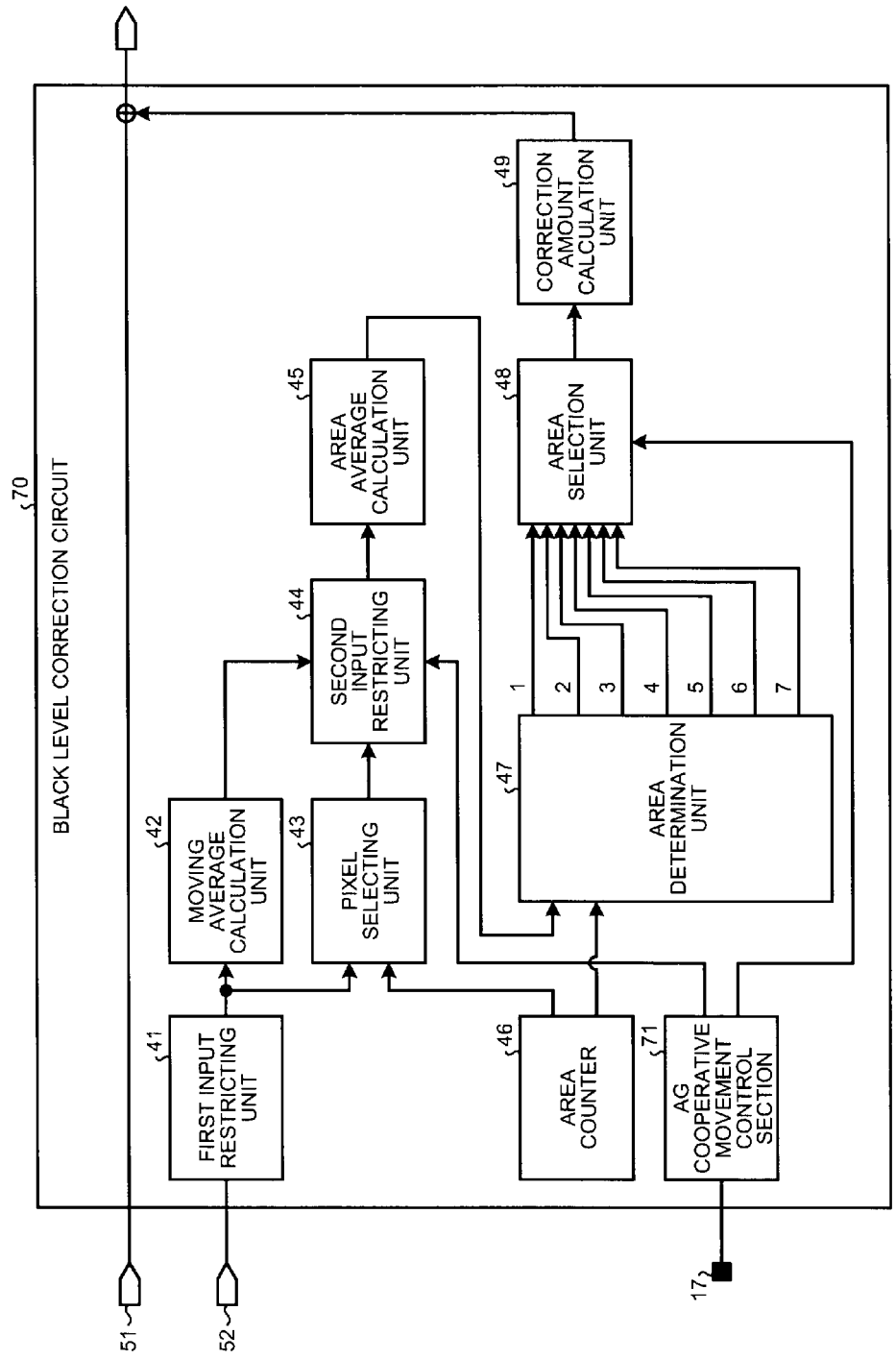
FIG. 12 is a block diagram showing a configuration of a black level correction circuit to be applied on a solid-state imaging device according to a third embodiment.

FIG. 12 is a block diagram showing a configuration of a black level correction circuit to be applied to a solid-state imaging device according to a third embodiment. A black level correction circuit 70 according to the present embodiment is applied in place of the black level correction circuit 24 (see FIG. 6) according to the first embodiment. The same reference numerals are denoted for the same portions as the first embodiment, and redundant description will be appropriately omitted.

An AG cooperative movement control unit 71 receives the AG coefficient 17 from the DSP 12 (see FIG. 2). The AG cooperative movement control unit 71 controls the second signal level range in the second input restricting unit 44 in cooperation with the AG coefficient 17 in the imaging of a subject image by the effective pixel section 31. The AG cooperative movement control unit 71 controls the selection of the area by the area selection unit 48 in cooperation with the AG coefficient 17 in the imaging of the subject image by the effective pixel section 31.

In the image sensor 22 (see FIG. 1), the dark period shading may degrade in accordance with increase in AG. The black level correction circuit 70 reduces the area to use for the black level correction if the degradation of the dark period shading becomes significant when the AG coefficient 17 becomes greater than or equal to a predetermined value, for example. The image processing circuit 20 can correct the black level corresponding to the degradation of the dark period shading by including the black level correction circuit 70.

In the image sensor 22, the noise may increase in accordance with increase in AG. The black level correction circuit 70 widens the second signal level range to use in the second input restriction by the second input restricting unit 44 if the increase in noise becomes significant when the AG coefficient 17 becomes greater than or equal to a predetermined value. The image processing circuit 20 can correct the black level corresponding to the increase in noise by including the black level correction circuit 70. Therefore, the image processing circuit 20 can obtain a high quality image by the highly accurate black level correction.

The AG cooperative movement control unit 71 merely needs to be able to control at least one of the selection of the area and the second signal level range in cooperation with the AG coefficient 17. The black level correction circuit 70 may control at least one of the selection of the area and the second signal level range in cooperation with a temperature distribution of the effective pixel section 31 and the OB section 32 other than the AG coefficient 17 or in addition to the AG coefficient 17.

In the effective pixel section 31 and the OB section 32, the degradation of the dark period shading and the increase in noise become the more significant the higher the temperature. The black level correction circuit 70 performs the selection of the area in cooperation with the temperature distribution of the effective pixel section 31 and the OB section 32 to correct the black level in accordance with the change in the dark period shading by the temperature distribution. Furthermore, the black level correction circuit 70 can correct the black level in accordance with the change in noise by the temperature distribution by setting the second signal level range cooperating with the temperature distribution of the effective pixel section 31 and the OB section 32.

The camera module 10 applied with the solid-state imaging device 11 of each embodiment may be an electronic device other than the digital camera such as a portable telephone with a camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising a black level correcting section configured to correct a black level of an effective pixel signal read out from an effective pixel section in which a light enters a photoelectric conversion element based on a black level signal read out from an optical black section in which a photoelectric conversion element is light shielded, wherein
the black level correcting section includes,
a first input restricting unit configured to perform a first input restriction, having a preset first signal level range as a reference, on the black level signal;
a moving average calculation unit configured to calculate a moving average of signal values for the black level signal subjected to the first input restriction;
a second input restricting unit configured to perform a second input restriction, having a second signal level range including the moving average as a reference, on the black level signal subjected to the first input restriction; and
a correction amount calculation unit configured to calculate a difference of an average of signal values subjected to the second input restriction and a black level standard value, which is a standard of the black level of the effective pixel signal, as a correction amount to apply on the effective pixel signal.

2. The image processing device according to claim 1, wherein
the second input restricting unit performs the second input restriction on the black level signal from a plurality of areas set in the optical black section; and
the black level correcting section further includes an area selection unit configured to select an area in which the black level signal is used for the calculation of the correction amount in the correction amount calculation unit from the plurality of areas.

3. The image processing device according to claim 2, wherein the black level correcting section further includes an analog gain cooperative movement control section configured to control the selection of the area in the area selection unit in cooperation with an analog gain in an imaging of a subject image by the effective pixel section.

4. The image processing device according to claim 3, wherein the analog gain cooperative movement control section reduces the area to be selected in the area selection unit in accordance with an increase in the analog gain.

5. The image processing device according to claim 2, wherein the black level correcting section controls at least one of the second signal level range and the selection of the area in the area selection unit in cooperation with a temperature distribution of the effective pixel section and the optical black section.

6. The image processing device according to claim 1, wherein
the second input restricting unit performs the second input restriction on the black level signal from a plurality of areas set in the optical black section; and
the correction amount calculation unit applies each correction amount calculated for every area on the effective pixel signal from the effective pixel area corresponding to the area of the effective pixel section.

7. The image processing device according to claim 1, wherein the black level correcting section further includes an analog gain cooperative movement control section configured to control the second signal level range in cooperation with an analog gain in an imaging of a subject image by the effective pixel section.

8. The image processing device according to claim 7, wherein the analog gain cooperative movement control section enlarges the second signal level range in accordance with an increase in the analog gain.

9. The image processing device according to claim 1, wherein the first input restricting unit holds a preset upper limit value as an upper limit of the first signal level range.

10. The image processing device according to claim 1, wherein the second input restricting unit holds a preset signal value range, and assumes the signal value range having the moving average calculated by the moving average calculation unit as a center as the second signal level range.

11. The image processing device according to claim 1, wherein the moving average calculation unit uses a pixel in which a signal value is input immediately before a signal value of a target pixel, which is a determination target of the second input restriction in the second input restricting unit, for the calculation of the moving average.

12. An image processing method comprising:
performing a first input restriction, having a preset first signal level range as a reference, on a black level signal read out from an optical black section in which a photoelectric conversion element is light shielded;
calculating a moving average of a signal value for the black level signal subjected to the first input restriction;
performing a second input restriction, having a second signal level range including the moving average as a reference, on the black level signal subjected to the first input restriction; and
calculating a difference of a black level standard value, which is a standard of a black level of an effective pixel signal read out from an effective pixel section in which light enters a photoelectric conversion element, and an average of the signal value subjected to the second input restriction as a correction amount to apply on the effective pixel signal.

13. The image processing method according to claim 12, further comprising:
setting a plurality of areas in the optical black section;
performing the second input restriction on the black level signal from the plurality of areas; and
selecting an area in which the black level signal is used for the calculation of the correction amount from the plurality of areas.

14. The image processing method according to claim 13, further comprising controlling the selection of the area in cooperation with an analog gain in an imaging of a subject image by the effective pixel section.

15. The image processing method according to claim 12, further comprising:
setting a plurality of areas in the optical black section;
performing the second input restriction on the black level signal from the plurality of areas; and
applying each correction amount calculated for every area on the effective pixel signal from an effective pixel area corresponding to the area of the effective pixel section.

16. The image processing method according to claim 12, further comprising controlling the second signal level range in cooperation with an analog gain in an imaging of a subject image by the effective pixel section.

17. A solid-state imaging device comprising:
a lens unit configured to retrieve light from a subject and image a subject image;

an image sensor, including a pixel array, configured to image the subject image; and
an image processing device configured to perform signal processing on the subject image retrieved by the image sensor; wherein
  the image sensor includes,
    an optical black section configured to output a black level signal by a light shielded photoelectric conversion element, and
    an effective pixel section configured to output an effective pixel signal by a photoelectric conversion element to which a light enters;
  the image processing device includes a black level correcting section configured to correct a black level of the effective pixel signal based on the black level signal;
  the black level correcting section includes,
    a first input restricting unit configured to perform a first input restriction, having a preset first signal level range as a reference, on the black level signal,
    a moving average calculation unit configured to calculate a moving average of a signal value for the black level signal subjected to the first input restriction,
    a second input restricting unit configured to perform a second input restriction, having a second signal level range including the moving average as a reference, on the black level signal subjected to the first input restriction, and
    a correction amount calculation unit configured to calculate a difference of an average of signal values subjected to the second input restriction and a black level standard value, which is a standard of the black level of the effective pixel signal, as a correction amount to apply on the effective pixel signal.

18. The solid-state imaging device according to claim 17, wherein
  the second input restricting unit performs the second input restriction on the black level signals from a plurality of areas set in the optical black section; and
  the black level correcting section further includes an area selection unit configured to select an area in which the black level signal is used for the calculation of the correction amount in the correction amount calculation unit from the plurality of areas.

19. The solid-state imaging device according to claim 18, wherein the optical black section includes an offset region for the calculation of the moving average between the area positioned on a most upstream side in a horizontal transfer direction and an end on an upstream in the horizontal transfer direction of the optical black section.

20. The solid-state imaging device according to claim 17, wherein
  the second input restricting unit performs the second input restriction on the black level signals from a plurality of areas set in the optical black section; and
  the correction amount calculation unit applies each correction amount calculated for every area on the effective pixel signal from the effective pixel area corresponding to the area of the effective pixel section.

* * * * *